US007618578B2

(12) United States Patent
Manthei et al.

(10) Patent No.: US 7,618,578 B2
(45) Date of Patent: Nov. 17, 2009

(54) METHOD AND APPARATUS FOR FORMING CONCRETE BLOCKS

(75) Inventors: James A. Manthei, Petoskey, MI (US); Jeremy L. Manthei, Charlevoix, MI (US)

(73) Assignee: Rosetta Hardscapes LLC, Charlevoix, MI (US)

( * ) Notice: Subject to any disclaimer, the term of this patent is extended or adjusted under 35 U.S.C. 154(b) by 415 days.

(21) Appl. No.: 11/562,045

(22) Filed: Nov. 21, 2006

(65) Prior Publication Data

US 2008/0116352 A1 May 22, 2008

(51) Int. Cl.
*B29C 39/36* (2006.01)

(52) U.S. Cl. ...................... 264/334; 249/66.1; 249/112; 249/127; 425/439; 425/440

(58) Field of Classification Search ................ 249/112, 249/139, 137, 117, 187.1, 127; 425/440, 425/DIG. 44, 439; 426/389; 264/334
See application file for complete search history.

(56) References Cited

U.S. PATENT DOCUMENTS 2,614,309 A * 10/1952 Price .......................... 425/440
4,228,985 A * 10/1980 Gaudelli et al. ............... 249/93
5,268,137 A * 12/1993 Scott et al. .................. 264/225
6,997,427 B2 * 2/2006 Manthei ...................... 249/83
2002/0030303 A1 * 3/2002 Manthei et al. ............. 264/239
2002/0152709 A1 * 10/2002 Gresser et al. ................ 52/604
2003/0160147 A1 * 8/2003 Manthei ..................... 249/171
2005/0061947 A1 * 3/2005 Smirnov et al. ............. 249/140

* cited by examiner

*Primary Examiner*—Richard Crispino
*Assistant Examiner*—Daniel Lee
(74) *Attorney, Agent, or Firm*—MacMillan, Sobanki & Todd, LLC

(57) ABSTRACT

A method and apparatus for forming a concrete block in form having a resilient insert forming a cavity in which the block is cast and a rigid support for the resilient insert. After the block has cured, the form is inverted. One or more areas of the insert are tethered to the support so that at least a portion of the insert can fall a short distance from the support. The weight of the cast block sufficiently deforms the insert to allow the block to fall free from the insert. When the form is again inverted to its upright position, the insert falls back into the support and returns to its original shape.

18 Claims, 6 Drawing Sheets

METHOD AND APPARATUS FOR FORMING CONCRETE BLOCKS

CROSS-REFERENCE TO RELATED APPLICATIONS

Not Applicable.

STATEMENT REGARDING FEDERALLY SPONSORED RESEARCH OR DEVELOPMENT

Not Applicable.

TECHNICAL FIELD

The invention relates to a method and apparatus for casting concrete blocks.

BACKGROUND OF THE INVENTION

Concrete blocks may be formed with textured sides which may have undercuts. Because of the irregular surfaces, these blocks are not easily released from the form cavity in which they are cast. The shapes of the form cavity walls are such that the cured concrete block is locked within the form, even if the form is inverted. One method for releasing blocks with irregular surfaces from the form cavity is to hinge the side walls of the cavity so that the form walls may be pivoted away from the cast block after the concrete has sufficiently cured. This allows the block to be lifted from the form. Another method is to provide form walls which can be manually disassembled and separated from the block after it has cured, and reassembled for casting another block. The manual labor required to release or move the form sides from the each block so that it can be removed from the form adds to the cost for manufacturing the blocks. It has been particularly difficult to manufacture large concrete blocks having highly irregular surfaces which have the appearance of natural stone. It is desirable to form some surfaces of the blocks with deep undercuts which imitate natural characteristics of stone.

BRIEF SUMMARY OF THE INVENTION

The invention relates method and apparatus for casting concrete blocks in which at least some of the surfaces of the block may be irregular. The cast concrete blocks may simulate natural stone blocks which have sufficiently irregular sides with recesses or shapes which are not easily released from conventional concrete block molds.

The apparatus may include a form having a rigid support frame and a resilient insert which forms a cavity in which the block is cast. The surfaces of the insert which define the cavity are textured to form the surfaced of blocks cast in the cavity, and may include portions which project some distance into the cavity. The frame provides support for the resilient insert when concrete is poured into the insert cavity and while the concrete cures. When the form is turned upside down, a sufficient relief angle is provided between the frame and the insert to allow the insert to fall freely from the frame. Edges or corners of the insert are loosely secured to the frame, for example, with cables, chains, bolts or rods, so that when the frame is inverted, the insert will fall only a short distance from the frame. After a concrete block cast in the mold insert cavity has cured, the support frame is inverted so that the mold insert will fall a short distance from the frame. The weight of the block causes the resilient insert to distort and bend away from sides of the block, allowing the block to fall freely from the insert.

In one embodiment, a forklift is used to invert the form for separating the cured block from the form. The forklift may include a second set of tines or a plate which can be moved to a short distance from the form for catching the block as it falls from the form and for transporting the block either to a storage area or to a vehicle for transportation. It will be appreciated that other equipment may be used to invert the form for removing the block.

DETAILED DESCRIPTION OF THE INVENTION

Figure 1:
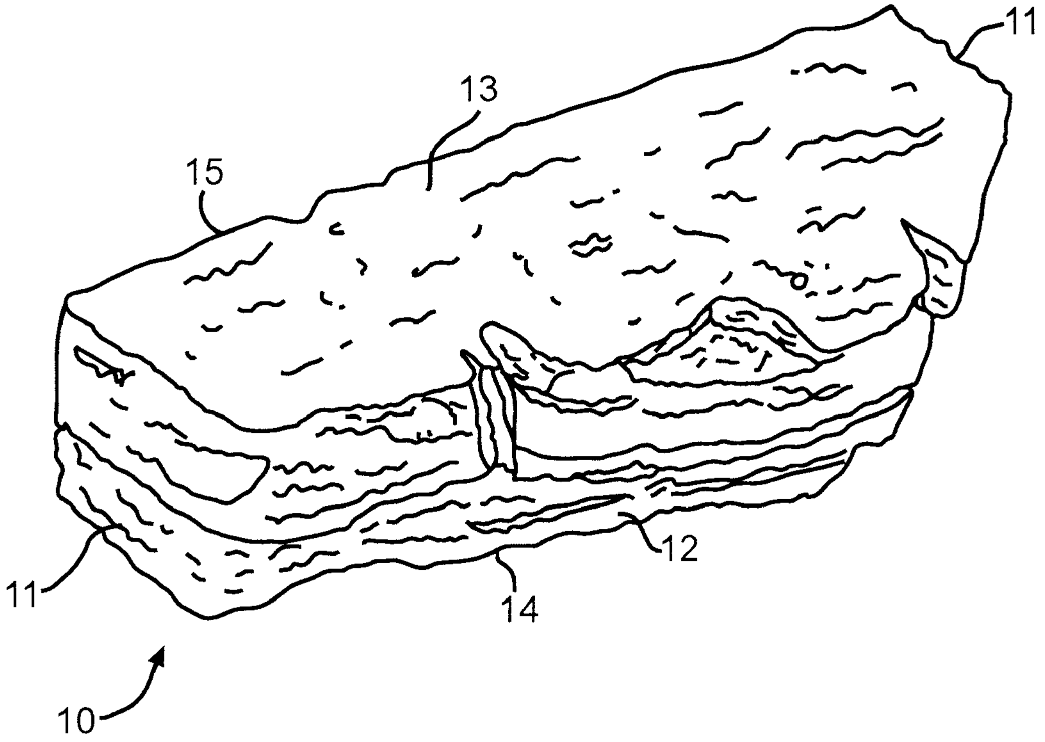
FIG. 1 a perspective view as seen from the upper front left of a retaining wall block which imitates a highly weathered sandstone block made according to the invention.

In the following description of the invention, certain terminology will be used for the purpose of reference only, and are not intended to be limiting. Terms such as “upper” and “lower” refer to directions in the drawings to which reference is made. Terms such as “top”, “bottom”, “horizontal”, and “vertical” describe the orientation of portions of the component within a consistent but arbitrary frame of reference which is made clear by reference to the text and the associated drawings describing the component under discussion. Such terminology will include the words specifically mentioned above, derivatives thereof, and words of similar import.

Figure 2:
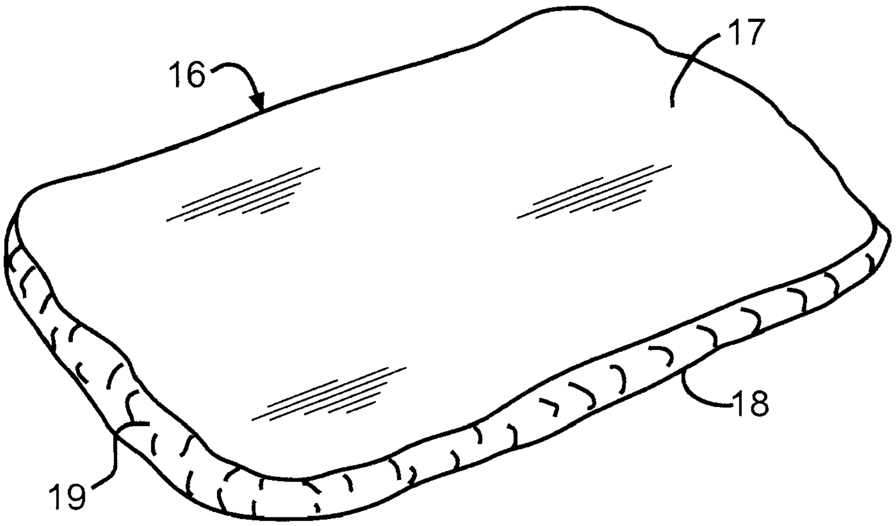
FIG. 2 is a perspective view of a paving stone which may be made according to the invention.

FIG. 1 of the drawings illustrates an exemplary cast concrete retaining wall block 10 which is formed to simulate a highly weathered sandstone block or other types of highly textured rock. The sides 11, front 12, top 13 and bottom 14 surfaces of the block may have numerous irregular undercuts which simulate fissures and erosion patters in the block. For the illustrated block 10, a back surface 15 is the surface formed by the surface of the wet concrete when it is poured into a form cavity. The back surface 15 will be generally flat. It will be appreciated that blocks may be formed to simulate other types of stones, and that they may be formed with any desired surface patterns, Or the invention may be used to cast blocks or articles which do not simulate stone blocks. The invention is particularly useful for casting concrete articles with shapes having undercut surface areas which make it difficult to remove the cast articles from a conventional mold cavity. The invention also may be used for casting flat concrete paving stones and steps, such as the paving stone 16 illustrated in FIG. 2 which has a generally flat top 17 and bottom 18 and generally rounded or irregular sides 19. The sides may prevent the paving stone 16 from releasing from a mold cavity. Blocks, paving stones, or other articles formed according to the invention may be relatively small, having a weight less than 100 pounds, or they may be quite large, having a weight greater than 2000 pounds.

Figure 3:
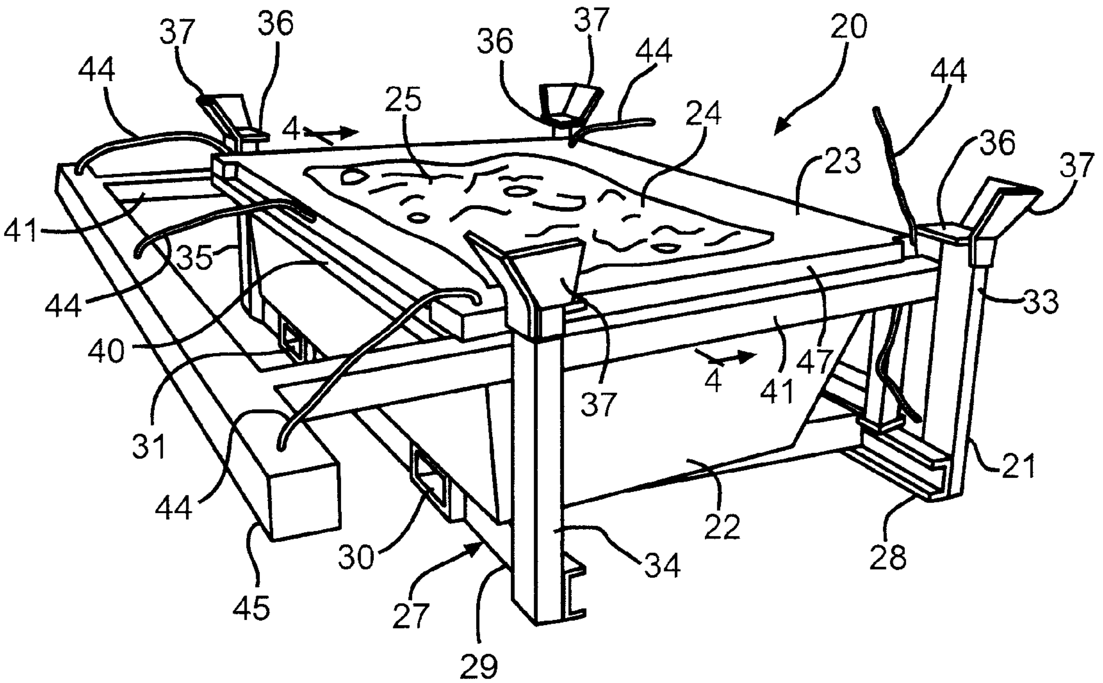
FIG. 3 is a perspective view as seen from an upper side of a form for casting concrete blocks in accordance with one embodiment of the present invention.
Figure 4:
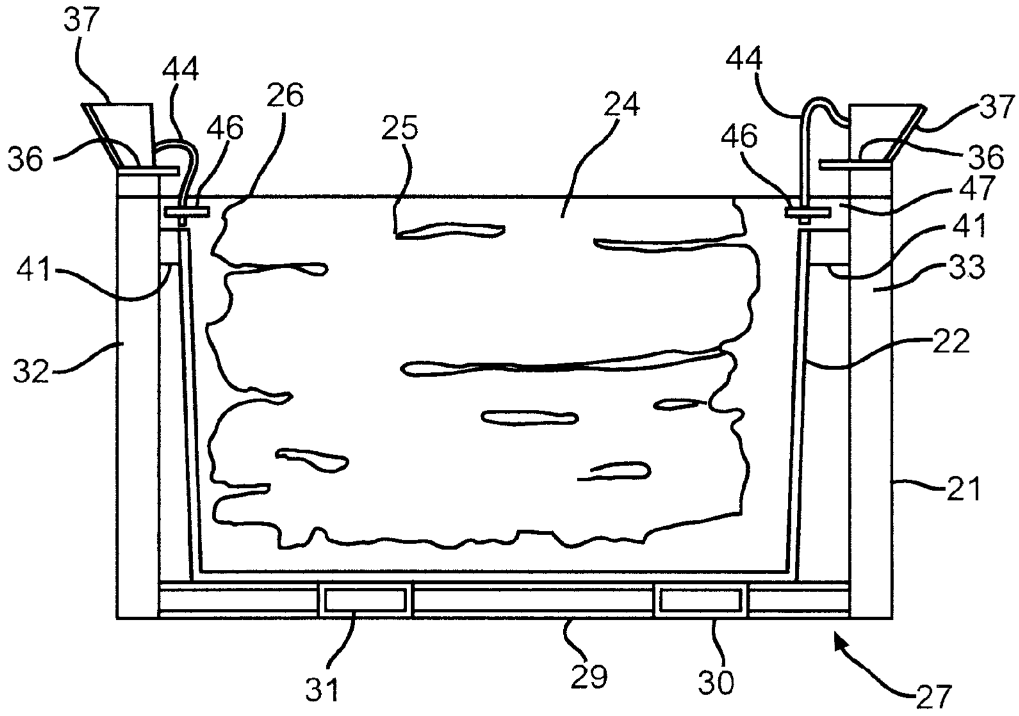
FIG. 4 is a sectional view taken along line 4-4 of FIG. 3.

FIGS. 3 and 4 show an exemplary form 20 in which a concrete block, such as the exemplary block 10, is cast in accordance with one embodiment of the present invention. The form 20 includes a rigid frame 21, a rigid support 22 which supports a resilient insert 23 while a block is cast in a cavity 24 formed in the insert 23. Surfaces 25 of the resilient insert 23 which define the cavity 24 are shaped and textured to impart a desired shape and surface configuration to blocks cast in the cavity 24. The support is designed to prevent flexing or distortion of the resilient insert while a block is cast in the cavity 23. According to the invention, the shape and size of the support 22 will depend on the shape, size and strength of the insert 23.

If the block cast in the cavity 24 is an imitation of a weathered natural stone, for example, the insert cavity surfaces 25 may be highly irregular with a number of projections for defining erosion grooves on the cast block surface. The cavity 24 has a top opening 26 through which the concrete is poured. Typically, the surface of the block at the top opening 26 will either be the back of a retaining wall block where the back is not visible, or the bottom of a block which is used where both front and back sides will be visible. As shown in FIG. 4, the cavity top opening 26 may have dimensions in some areas which are smaller than the maximum dimensions of the cast block.

Preferably, the frame 21 is made from steel since it must be rigid and support the weight of the cast block. However, it should be understood that the frame 21 may be made of any other suitable material having the required strength and durability. If the invention is used for casting small blocks, for example, wood or a plastic may be acceptable for the frame 21.

The exemplary frame 21 includes a base 27 having front and rear rails 28 and 29. The front and rear rails 28 and 29 provide longitudinal support and stability to the frame 21. The base 27 includes two spaced, parallel channels 30 and 31 which extend perpendicularly between the front and rear rails 28 and 29. The channels 30 and 31 have a rectangular cross section, closed sides and open ends for receiving the spaced tines of a forklift (not shown) used to transport and to invert the form 20, as is discussed in detail below. It should be appreciated that other constructions configurations may be used.

The exemplary frame 21 is show as including four posts 32-35 which extend generally vertically from the base 27. The posts 32-35 provide vertical support and stability to the frame 21. Each post 32-35 is provided with a flat top 36 and an upwardly and outwardly flared edging 37. The posts 32-35 are sufficiently high to allow the forms 20 to be stacked. The flared edging 37 helps to align the forms 20 as they are stacked. It should be understood, however, that the form 20 may have other configurations which cooperate with any portion of another form to stabilize and support the other from when stacked.

The frame 21 is illustrated as having two spaced, parallel side channels, tubes or rails 40 and two spaced, parallel side channels, tubes or rails 41. The channels 40 and 41 are connected together and to the corner posts 32-35 to form a rectangle which provides lateral support and stability to the frame 21. It should be understood that the frame 21 may include any number of support rails, tubes, channels, etc. in any suitable configuration the frame 21 with the necessary strength.

The rigid support 22 is shown formed from a plurality of steel panels 42 which are welded together. The number and arrangement of panels 42 will depend on the exterior shape of the resilient insert 23 and the amount of support which the insert requires to maintain its shape while an article is cast in the insert. The plates 42 may be secured to the frame 21 rather than to each other and may only support areas of the insert which require support. The support 22 also maybe formed in any other suitable manner, such as a one piece stamping or a mold. If the insert 23 has a low height, as when casting paver blocks, it may be only necessary to support the bottom of the insert 23.

The rigid support 22 is connected to the frame 21 by welding, mechanical fasteners, or any other suitable mechanism that will secure the support 22 to the frame 21. The insert 23 has an outer surface 43 that generally conforms to and is supported by the interior of the support 22 without being retained by the support 22. In other words, there must be a sufficient relief angle where the insert 23 contacts the support 22 to allow the insert 23 to fall freely from the support 22 when the form 20 is inverted.

The resilient insert 23 may be composed of an elastomer, e.g. natural or synthetic rubber. It must be understood, however, that resilient insert 23 may be composed of any material suitable to support concrete during casting and with sufficient resilience to allow the material to be pulled away from the concrete and to return to it original shape when positioned in the support 22.

At least one or more points on the resilient insert 23 are tethered, i.e. moveably connected, to the frame 21 or to the support 22. The tethers may be, for example, in the form of cables, ropes, strings, wires, lose bolts, or any other element suitable to tether the insert 23 to the frame 21 or the support 22. In the illustrated form 20, the tethers are five flexible, plastic coated wire cables 44. At a front side of the form 20, cables 44 are secured between the front corners of the insert 23 and the front channel 40 of the frame 21. Three rear cables 44 are shown secured between the rear corners and the rear center of the insert 23 and a rear bar 45 of the frame 21. The cables 44 or other forms of tethers may be secured by any desired method depending on the type of tether used and the strength required, such as by knots or conventional cable clamps for wire cables or rope, or welding for chain, or nuts for bolts.

The insert 23 may have outwardly extending edges 47 which surround the cavity opening 26. The edges may be rectangular and the cables 44 or other form of tethers may be secured to points adjacent the corners. Preferably, to extend the life of the resilient insert 23 reinforcing members 46 are embedded in the edges 47 of the insert 23 to reduce the risk that the insert will tear when a block is dumped from the form 20. The tether reinforcing members 46 disperse forces exerted between the cables 44 and the insert 23. The members 46 may be made of steel or of high density plastic or of any other material suitably to reinforce the insert 23 without unduly interfering with the resiliency of the insert 16.

Figure 5:
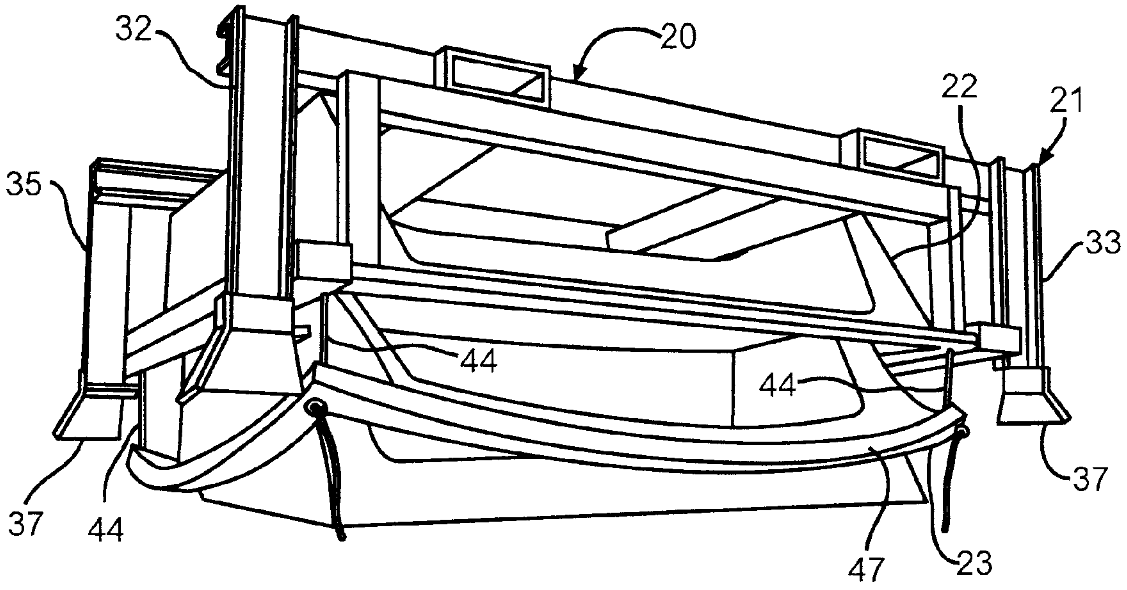
FIG. 5 perspective view as seen from a bottom side of the form of FIG. 1 inverted for removing a cast block from the form.

Referring to FIG. 5, a cured concrete block is removed from the form 20 by inverting the form 20 above a surface which will catch the block. When the form 20 is inverted, the resilient insert 23 will fall from the form 20 to the extent permitted by the wire cables 44 or other type of tether. Due to its resiliency, the insert 23 will be stretched from its corners and edges and will deform sufficiently to allow the block to fall from the insert cavity 24.

Figure 6:
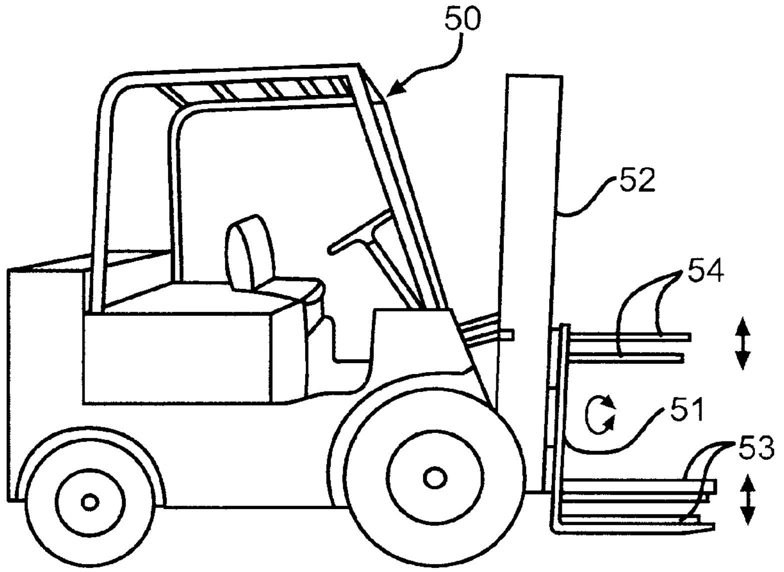
FIG. 6 is a perspective view of a fork lift for use in the method of the invention.

For large blocks which have a heavy weight, preferably a forklift is used to implement the method of the invention. A preferred type of forklift 50 is illustrated in FIG. 6. A basic conventional forklift has a pair of parallel tines which may be moved up and down on a generally vertical mask which may be tilted over a limited range. On some forklifts, the tines also may be moved to change the spacing between the tines. The forklift 50 has an added feature of a mechanism 51 mounted on a mask 52. The mechanism 51 can be moved up and down on the mask 52 and can be rotated on the mask 52. A pair of tines 53 are mounted on the mechanism 51. In addition, a flat support plate or a second pair of tines 54 are mounted on the mechanism 51 for movement towards and away from the tines 53. A fork lift of this type is commercially available.

Figure 7:
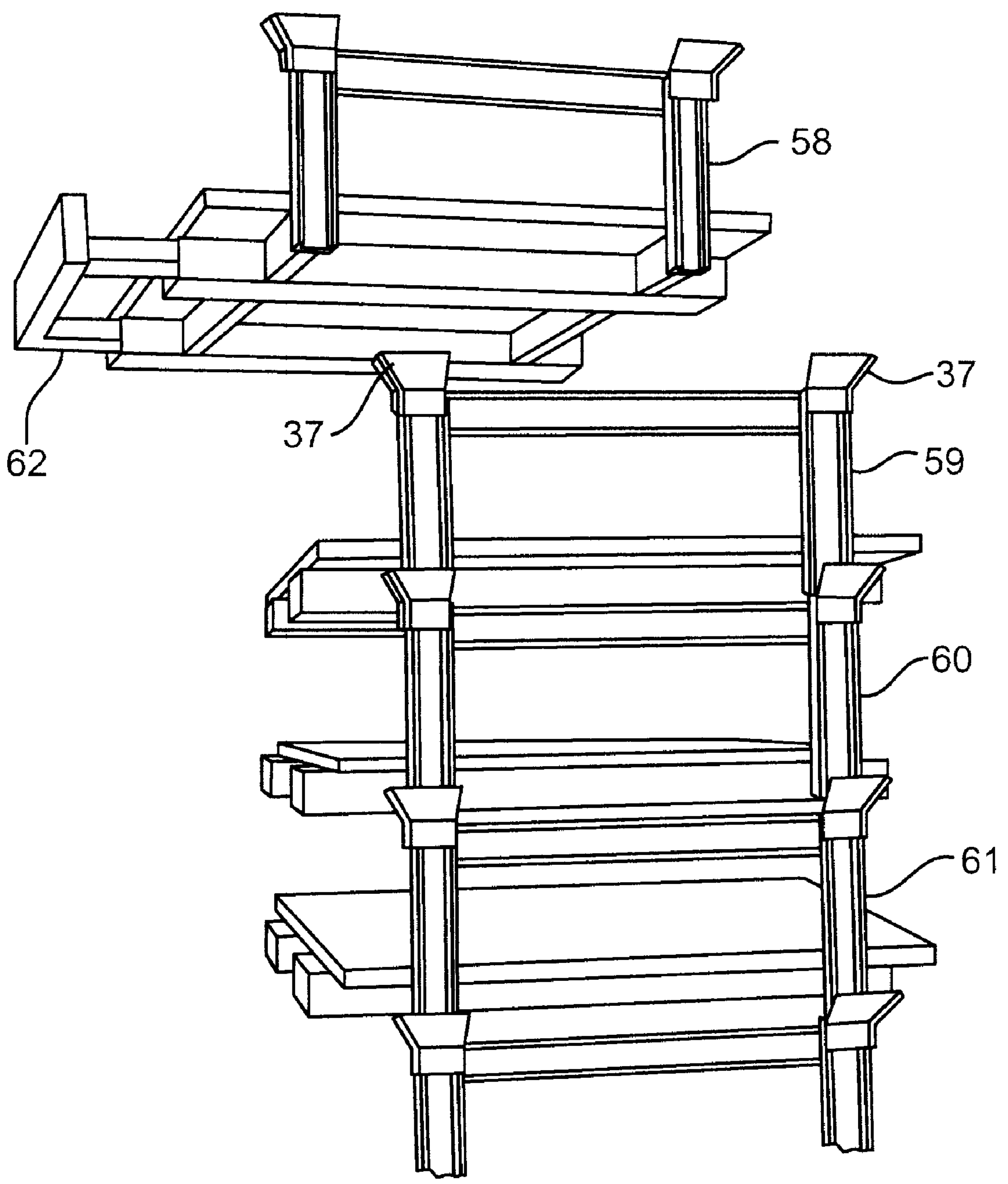
FIG. 7 is a perspective diagrammatic view showing forklift tines placing a form in which concrete has been poured on a stack of forms.

Referring to FIG. 7, a form 58 is shown being stacked on top of a stack of three forms 59-61. As the forms 58-61 are filled with wet concrete, they may be easily stacked while blocks cast in the forms cure. Either the forklift 50 or a basic forklift which only has tines which may be raised and lowered may be used to stack the forms 58-61. Only the tines 62 of the forklift are shown in FIG. 7. The flared edging 37 on the tops of the corner posts of the stacked form 59 facilitate alignment of the form 58 with the form 59.

Figure 8:
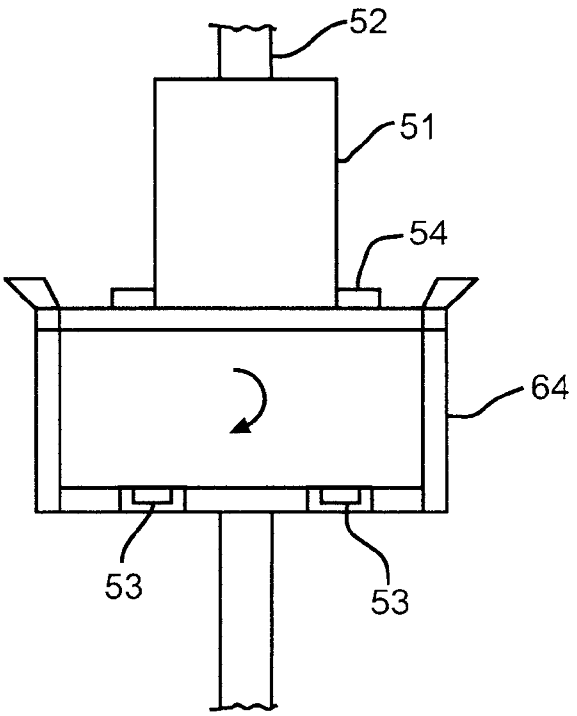
FIG. 8 is a fragmentary diagrammatic front view showing the form with a cured block as it is picked up by forklift.
Figure 9:
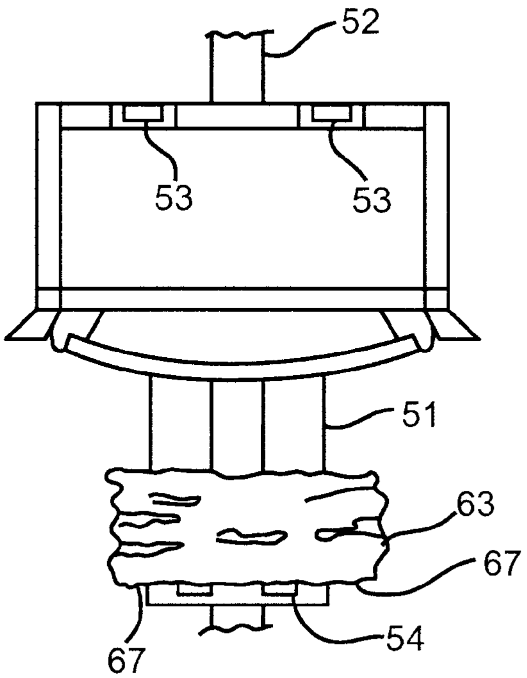
FIG. 9 is a fragmentary diagrammatic front view showing the form of FIG. 7 inverted on the forklift and separated from the cast block.

FIGS. 8 and 9 are fragmentary diagrammatic views show the process for removing a cured block 63 from a form 64 using the forklift 50 of FIG. 6. The form 64 is picked up by inserting the forklift tines 53 into the channels 65 on the form 64 and lifting. The second tines 54 are moved against the form 64 so that the form 64 is clamped between the forklift tines 53 and the second tines 54. The forklift mechanism 51 is then rotated 180° and the second tines 54 are lowered, as shown in FIG. 9. This allows a form insert 66 to fall from the form by the length of the tether and the cured block 63 to fall from the insert 66 to the second tines 54. The weight of the block 53 stretches and deforms the insert 66 so that any surface projections on the insert cavity surface will pull away from the block 63. The forklift may then be used to move the cured block to a storage area or to a transportation vehicle. Preferably, the block 63 overhangs edges 67 of the second tines 54. The overhanging may be lowered on blocks which space the block 63 above a support surface so that it can easily be picked up at a later time with a forklift.

Figure 10:
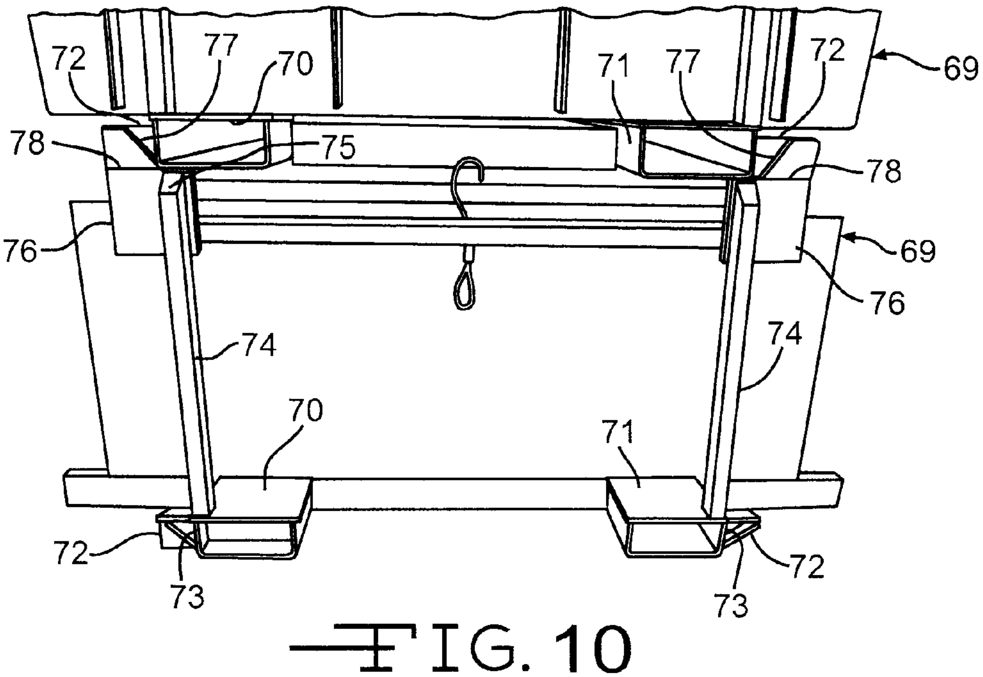
FIG. 10 is a fragmentary side elevational view showing a portion of two forms stacked according to a modified embodiment of the invention.
Figure 11:
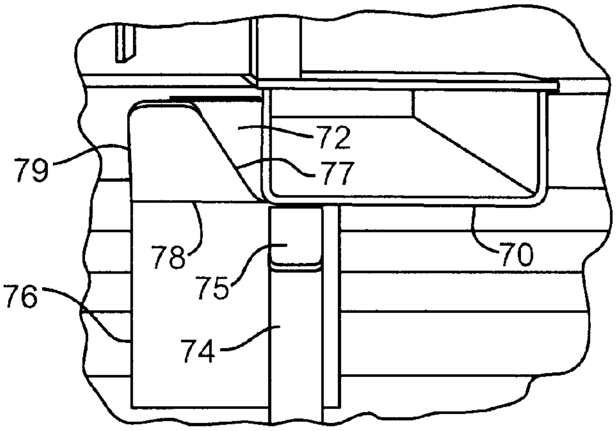
FIG. 11 is an enlarged fragmentary side elevational view showing the brackets for aligning the forms in FIG. 10 when they are stacked.
Figure 12:
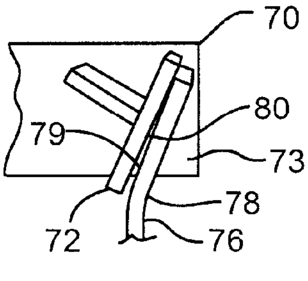
FIG. 12 is an enlarged fragmentary left side elevational view of the brackets of FIG. 11.

FIGS. 10-12 show a modified arrangement for stacking forms 69 either when not in use or while blocks cast in the forms 69 cure. Each form includes at its bottom two parallel channels 70 and 71 which are spaced for receiving forklift tines (not shown) for lifting, stacking and inverting the forms 69. A bracket 72 is welded or otherwise secured to an outer side 73 adjacent each end of each channel. A post 74 extends vertically from each channel 70 and 71 to an upper end 75 adjacent the top of each form 69. A bracket 76 is secured adjacent the upper end 75 of each post 74. As seen in FIGS. 10 and 11, the brackets 76 have upwardly and outwardly angles surfaces 77 which, when an upper form 69 is stacked on a lower form 69, center the forms so that the channels 70 and 71 are supported on the posts 74 and brackets 76 on the lower form 69. FIG. 12 is a fragmentary left side elevational view showing additional details of the brackets 72 and 76. The brackets 76 have a bend 78 which forms an upwardly and outwardly angled surface 79. The bracket 72 is secured to the outer side 73 of the channel 70 so that a surface 80 on the bracket 72 forms substantially the same angle as the angle of the upper surface 79 on the bracket 76. The angled surfaces 79 and 80 cooperate to align the stacked forms 69 in a front to back direction. Other arrangements for aligning the stacked forms also will be apparent to those skilled in the art.

It should be appreciated that the illustrated components of the frame 21 and of the rigid support 22 may be varied, combined or eliminated, so long as sufficient support is provided for the resilient insert 23 while a block or other article is cast and allowed to cure in the resilient insert, and so long as the resilient insert 23 with a cast block and the support can be inverted and the resilient insert is allowed to at least partially fall from its inverted support and deform to release the cast block. It also will be appreciated that various other modifications and changes may be made to the above described preferred embodiment of without departing from the scope of the following claims.

The invention claimed is:

1. A form for casting a concrete block including a rigid support, a resilient insert defining a cavity with surfaces shaped to provide a desired shape and texture to a block cast in said cavity, said resilient insert having an opening into said cavity, said support having a surface for supporting said resilient insert while a block is cast in said cavity, and at least one tether securing at least one predetermined area of said resilient insert to said frame whereby, when said form is inverted, at least the predetermined area of said resilient insert is free to fall a limited distance away from said frame and said tether allows said resilient insert to distort so that a cast block will fall from said resilient insert opening.

2. A form for casting a concrete block, as set forth in claim 1, and wherein said resilient insert has an edge surrounding said insert opening, and wherein a plurality of tethers are secured to predetermined areas on said edge.

3. A form for casting a concrete block, as set forth in claim 2, and wherein said tethers are selected from the group consisting of a cable, a rope, a chain, a rod, or a bolt.

4. A form for casting a concrete block, as set forth in claim 3, and wherein said support includes a frame, and wherein one end of each of said tethers is connected to said frame.

5. A form for casting a concrete block, as set forth in claim 2, and wherein said tethers are flexible.

6. A form for casting a concrete block, as set forth in claim 2, and wherein said edge is generally rectangular having four corners, and wherein said predetermined areas include four areas adjacent said four corners.

7. A form for casting a concrete block, as set forth in claim 6, and wherein reinforcements are embedded in said resilient insert at said predetermined areas.

8. A form for casting a concrete block, as set forth in claim 7, and wherein said support includes a frame, and wherein one end of each of said tethers is connected to said frame.

9. A form for casting a concrete block, as set forth in claim 1 and wherein said support has a lower area including two parallel channels spaced apart for receiving tines of a fork lift.

10. A form for casting a concrete block, as set forth in claim 9, and wherein said two parallel channels each have opposing ends on opposite sided of said form, and further including four vertical posts with a separate vertical post mounted adjacent each end of said two parallel channels, said posts having sufficient height to allow a second form to be stacked on said form and supported on said four posts.

11. A form for casting a concrete block, as set forth in claim 1, and wherein said support includes a frame having a plurality of generally vertical posts, said posts having a sufficient height to allow a second form to be stacked on said form and supported by said posts.

12. A form for casting a concrete block, as set forth in claim 1, and wherein said tether is flexible.

13. A method for casting a concrete block comprising the steps of:

a) providing a form having a rigid support, a resilient insert supported by said rigid support while the block is cast in a cavity formed in said resilient insert, and wherein said resilient insert is tethered to said support;

b) pouring concrete into said insert cavity through a top opening;

c) allowing the concrete to cure;

d) inverting said form to allow the tethered insert to fall from said support a distance limited by the tether and to distort sufficiently to allow the cured block to fall from said insert through gravity.

14. A method for casting a concrete block, as set forth in claim 13, and wherein said form is provided with a pair of spaced parallel channels adjacent a bottom of said form, and said form is inverted by engaging said channels with tines on a forklift, and using the forklift for lifting and inverting said form.

15. A method for casting a concrete block, as set forth in claim 13, wherein the forklift includes a cast block support which is movable towards and away from the forklift tines, and further including the step of moving the cast block support into contact with a top of the insert prior to inverting the insert.

16. A method for casting a concrete block, as set forth in claim 15, and further including the step of moving the cast block away from the forklift tines after the form is inverted by the forklift, whereby the form is supported by the forklift tines and the block separates from the insert and is supported by the cast block support.

17. A method for casting a concrete block, as set forth in claim 13, and wherein the resilient insert is provided with a textured surface with raised areas which shape the cast block to imitate natural stone.

18. A method for casting a concrete block, as set forth in claim 13, and after a cast block falls from the inverted resilient insert, further including the step of returning the form to its original position, wherein said resilient falls back into and is supported by the support for casting another block.

* * * * *